US011128456B2

(12) United States Patent
Muller et al.

(10) Patent No.: US 11,128,456 B2
(45) Date of Patent: Sep. 21, 2021

(54) ASSURED TRANSPORT OF DATA OVER A NETWORK

(71) Applicant: Cisco Technology, Inc., San Jose, CA (US)

(72) Inventors: Justin J. Muller, San Jose, CA (US); Katherine O'Keeffe, San Francisco, CA (US); Carlos M. Pignataro, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 276 days.

(21) Appl. No.: 16/193,244

(22) Filed: Nov. 16, 2018

(65) Prior Publication Data

US 2020/0092091 A1 Mar. 19, 2020

Related U.S. Application Data

(60) Provisional application No. 62/733,156, filed on Sep. 19, 2018.

(51) Int. Cl.
*H04L 29/06* (2006.01)
*H04L 9/08* (2006.01)
(Continued)

(52) U.S. Cl.
CPC ............ *H04L 9/0866* (2013.01); *G06F 16/27* (2019.01); *G06F 21/602* (2013.01);
(Continued)

(58) Field of Classification Search
CPC .... H04L 2209/38; H04L 9/3297; G06F 21/64
See application file for complete search history.

(56) References Cited

U.S. PATENT DOCUMENTS

2017/0054736 A1 2/2017 Krishnamurthy
2017/0126702 A1 5/2017 Krishnamurthy
(Continued)

FOREIGN PATENT DOCUMENTS

WO 2017/177260 A1 10/2017

OTHER PUBLICATIONS

S. Previdi, et al., "IPv6 Segment Routing Header (SRH)", draft-ietf-6man-segment-routing-header-11, Network Working Group, Internet-Draft, Mar. 28, 2018, 34 pages.
(Continued)

*Primary Examiner* — Jason K Gee
(74) *Attorney, Agent, or Firm* — Edell, Shapiro & Finnan, LLC

(57) ABSTRACT

In one example, a network entity obtains a network packet including data. The network entity performs a deterministic mathematical computation on the data to produce a string of characters derived from the data and inserts an indication of the string of characters into the network packet. The network entity provides the indication of the string of characters to a distributed ledger based on a secret unique identifier of the network entity. The distributed ledger stores the indication of the string of characters and records an indication of a time at which the indication of the string of characters was stored in the distributed ledger. The network entity obtains, from the distributed ledger, the indication of the time and inserts the indication of the time into the network packet. The network entity provides the network packet towards a destination.

20 Claims, 10 Drawing Sheets

(51) Int. Cl.
*G06F 16/27* (2019.01)
*H04L 9/06* (2006.01)
*G06F 21/60* (2013.01)

(52) U.S. Cl.
CPC .......... *H04L 9/0637* (2013.01); *H04L 9/0643* (2013.01); *H04L 63/0428* (2013.01); *H04L 2209/38* (2013.01)

(56) References Cited

U.S. PATENT DOCUMENTS

| | | | |
|---|---|---|---|
| 2017/0257358 A1* | 9/2017 | Ebrahimi | H04L 9/3247 |
| 2017/0302663 A1 | 10/2017 | Nainar et al. | |
| 2017/0344580 A1 | 11/2017 | King | |
| 2018/0019867 A1* | 1/2018 | Davis | H04L 9/0637 |
| 2018/0025181 A1 | 1/2018 | Barinov et al. | |
| 2018/0041571 A1* | 2/2018 | Rogers | H04L 67/22 |
| 2018/0082296 A1 | 3/2018 | Brashers | |
| 2018/0131590 A1 | 5/2018 | Penno et al. | |
| 2018/0204213 A1 | 7/2018 | Zappier et al. | |
| 2018/0220278 A1 | 8/2018 | Tal et al. | |
| 2018/0248701 A1 | 8/2018 | Johnson et al. | |
| 2018/0315027 A1* | 11/2018 | Kumar | H04L 63/062 |

OTHER PUBLICATIONS

P. Quinn, et al., "Network Service Header TLVs", draft-ietf-sfc-nsh-tlv-00.txt, Network Working Group, Internet-Draft, Jan. 29, 2018, 8 pages.

P. Quinn, Ed., et al., "Network Service Header (NSH)", Internet Engineering Task Force (IETF), Jan. 2018, ISSN: 2070-1721, RFC 8300, 40 pages.

Torsten Stein, "Faizod Anchoring", www.faizod.com, May 5, 2017, 7 pages.

Khwaja Shaik, "Why blockchain and IoT are best friends", Blockchain Unleashed: IBM Blockchain Blog, Jan. 12, 2018, https://www.ibm.com/blogs/blockchain/2018/01/why-blockchain-and-iot-are-best-friends/, 6 pages.

Wikipedia page, "Public key infrastructure", https://web.archive.org/web/20180917230307/https://en.wikipedia.org/wiki/Public_key_infrastructure, captured on Sep. 17, 2018, 9 pages.

Data Sheet, "Cisco Trust Anchor Technologies", C45-734230-00, Mar. 2015, www.cisco.com, 5 pages.

"Blockchain Solutions—Guardtime", https://guardtime.com/solutions/hadoop-big-data-lakes, downloaded from the internet on Sep. 4, 2018, 5 pages.

Ujjwal Guin, et al., "Ensuring Proof-of-Authenticity of IoT Edge Devices using Blockchain Technology", downloaded from the internet on Sep. 7, 2018, 8 pages.

* cited by examiner

ASSURED TRANSPORT OF DATA OVER A NETWORK

CROSS REFERENCE TO RELATED APPLICATION

This application claims priority to U.S. Provisional Application No. 62/733,156 filed Sep. 19, 2018, the entirety of which is incorporated herein by reference.

TECHNICAL FIELD

The present disclosure relates to network security.

BACKGROUND

A source often sends data to a destination over a network. The source may send the data autonomously or in response to a request from the destination. In a client-server model, the data is sent directly to a final destination (e.g., server). In a cloud model, which is more pervasive, the data is sent to a partial destination (e.g., datacenter, central repository, etc.), and is subsequently sent to the final destination. As more responsibility in data transportation is outsourced to machine learning and artificial intelligence, verifying the authenticity of data becomes more important.

DESCRIPTION OF EXAMPLE EMBODIMENTS

Overview

In one example embodiment, a network entity obtains a network packet that includes data. The network entity performs a deterministic mathematical computation on the data to produce a string of characters derived from the data and inserts an indication of the string of characters into the network packet. The network entity provides the indication of the string of characters to a distributed ledger based on a secret unique identifier of the network entity. The distributed ledger stores the indication of the string of characters and records an indication of a time at which the indication of the string of characters was stored in the distributed ledger. The network entity obtains, from the distributed ledger, the indication of the time and inserts the indication of the time into the network packet. The network entity provides the network packet towards a destination.

Example Embodiments

Figure 1:
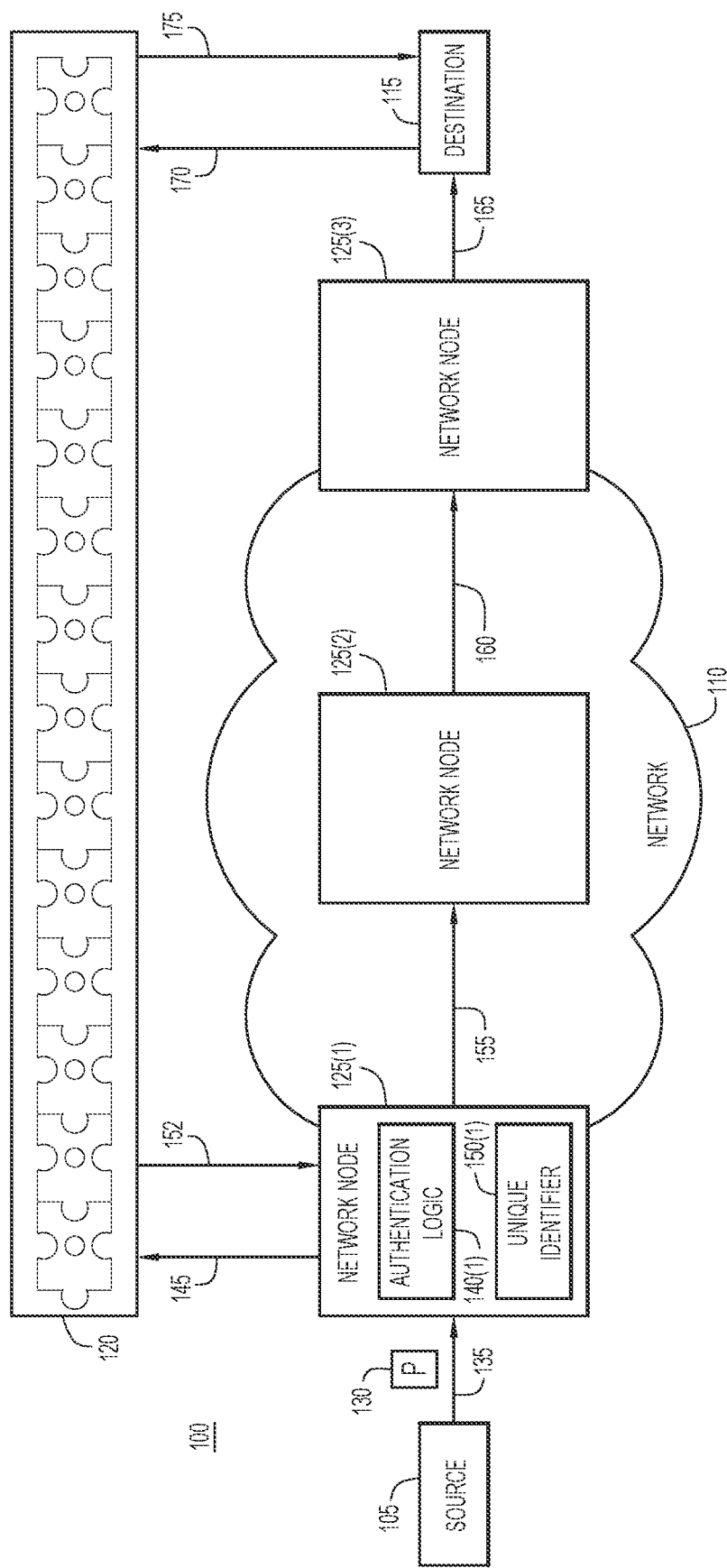
FIG. 1 illustrates a system configured to perform authentication of data in a network packet using a distributed ledger, according to an example embodiment.

With reference made to FIG. 1, shown is an example system 100 configured to perform authentication of data. System 100 includes source 105, network 110, destination 115, and a distributed ledger (e.g., a blockchain) 120. Network 110 includes network entities (e.g., network nodes, such as routers, switches, etc.) 125(1)-125(3). Network nodes 125(1) and 125(3) are edge nodes of network 110. Source 105 may be a special-purpose network-connected device (e.g., a "thing" in the Internet of Things (IoT)), such as a temperature sensor. Destination 115 may be a server, datacenter, and/or central repository configured to collect temperature data.

In one example, source 105 generates network packet 130 and, at 135, sends network packet 130 to network node 125(1). Network packet 130 is destined for destination 115 and may include data (e.g., temperature data). Conventionally, source 105 and destination 115 would use Public Key Infrastructure (PKI) to verify the authenticity of the data. Basically, a Public Key Infrastructure (PKI) would require a centralized certificate authority that provides a private key to source 105, and a paired public key to destination 115. Source 105 would use the private key to sign network packet 130, and destination 115 would use the public key to confirm that network packet 130 was signed by an entity with the private key.

Due to the ever-increasing sophistication and quantity of cyber-crimes, trust in network data is at an all-time low. When data is received at destination 115, it can be challenging to verify the authenticity of the data (e.g., verify that the data has not been altered), even using PKI. For example, PKI would only permit destination 115 to confirm that network packet 130 was signed by an entity with the private key, but not that network packet 130 was signed by source 105. This could be problematic if a bad actor obtains the private key and uses it to sign network packets. Moreover, PKI is very costly, cumbersome, and complicated to administer due to the plethora of active, expired, lost, and stolen private keys. The centralized certificate authority is essentially a single point of failure for the bad actor to exploit (e.g., obtain the private key of source 105).

Accordingly, authentication logic 140(1) is provided on network node 125(1) to replace conventional PKI for data authentication/verification purposes (although it will be appreciated that PKI may still be used for other purposes such as encryption). In particular, authentication logic 140(1) may cause network node 125(1) to perform operations that overcome the aforementioned problems in conventional network security arrangements. In one example, upon receiving network packet 130, network node 125(1) performs a deterministic mathematical computation (e.g., a hash computation) on the data to produce a string of characters (e.g., a digest) derived from the data, and inserts an indication of the string of characters into network packet 130.

At 145, network node 125(1) provides the indication of the string of characters to distributed ledger 120 based on unique identifier 150(1) of network node 125(1). Unique identifier 150(1) may be built into a Hardware Trust Anchor (HTA) of network node 125(1) (e.g., as part of the manufacturing process of network node 125(1)). An HTA may be a tamper-resistant device that stores cryptographic keys, for example. Examples of an HTA include hardware security module, trusted platform module, etc. The HTA may include a small storage space (e.g., memory/cryptoprocessor) that is more secure than standard memory. Unique identifier 150(1) may remain secret because it is stored on hardware (as opposed to software) of network node 125(1). Because the HTA prohibits direct digital access to unique identifier 150(1), unique identifier 150(1) may serve as an anti-counterfeiting measure that cannot be digitally copied or stolen, does not expire, and can be easily administered. Furthermore, the HTA may store any required credentials (e.g., Post Office Protocol (POP) certificates or similar) to prove that the device has access to unique identifier 150(1) without permitting access to unique identifier 150(1) itself.

In a first example, network node 125(1) establishes a connection to distributed ledger 120 using unique identifier 150(1) and provides the string of characters to distributed ledger 120. In one example, distributed ledger 120 is a network of blockchain nodes that can validate transactions to the blockchain, and network node 125(1) may communicate with just one of the blockchain nodes to perform a blockchain transaction on its behalf for purposes of these methods. For example, unique identifier 150(1) may serve as (or be used to generate) log-in credentials that provide access to distributed ledger 120. These log-in credentials effectively allow network node 125(1) to sign into distributed ledger 120 and post the string of characters (for storage in a block of the distributed ledger) while permitting distributed ledger 120 to correctly identify network node 125(1) as the entity that is posting the string of characters.

In a second example, network node 125(1) encrypts the string of characters using unique identifier 150(1) to produce an encrypted string of characters and provides the encrypted string of characters to distributed ledger 120. Unique identifier 150(1) may thus act as a private key. For example, network node 125(1) may pass the string of characters to the HTA, which may encrypt the string of characters with an encryption algorithm using unique identifier 150(1). Network node 125(1) may then receive back the encrypted string of characters. This enables using unique identifier 150(1) to encrypt the string of characters without ever directly accessing or reading unique identifier 150(1).

Upon receiving the indication of the string of characters, distributed ledger 120 stores the indication of the string of characters (in a block of distributed ledger 120) and records an indication of a time at which the indication of the string of characters was stored in distributed ledger 120 (e.g., a timestamp). In the first example (using unique identifier 150(1) for log-in credentials), distributed ledger 120 also stores an identification of network node 125(1) as having provided the string of characters to distributed ledger 120 based on unique identifier 150(1) (e.g., based on the log-in credentials). Identification of network node 125(1) may also be determined in the second example because the string of characters is encrypted using unique identifier 150(1).

At 152, network node 125(1) obtains, from distributed ledger 120, the indication of the time at which the indication of the string of characters was stored in (a block of the) distributed ledger 120. The indication of the time may be the timestamp itself or an address identifying a location in distributed ledger 120 at which the time is stored in distributed ledger 120. The indication of the string of characters may be stored at the same location as the time. In one example, the address is a block address of a blockchain. Network node 125(1) may insert the indication of the time into network packet 130. Thus, at this stage, network packet 130 includes the indication of the string of characters and the indication of the time at which the indication of the string of characters was stored in distributed ledger 120, and distributed ledger 120 includes the indication of the string of characters.

Network node 125(1) provides network packet 130 towards destination 115. In this example, at 155 network node 125(1) sends network packet 130 to network node 125(2), which sends network packet 130 to network node 125(3) at 160. Destination 115 obtains network packet 130 from network node 125(3) at 165 and extracts the indication of the time from network packet 130. If the indication of the time in the network packet 130 is an address, destination 115 may obtain the time from distributed ledger 120. Thus, destination 115 has assurance of the time at which the data was stored in distributed ledger 120, which can be useful for verifying the authenticity of the data. For example, the time may approximate the time at which the data arrived at network node 125(1).

Destination 115 may also perform a second deterministic mathematical computation (e.g., a hash computation) on the data to produce a second string of characters (e.g., a digest) derived from the data. Further, at 170, destination 115 may request the indication of the string of characters from distributed ledger 120, and at 175 destination 115 may obtain the indication of the string of characters from distributed ledger 120. Thus, destination 115 may determine whether the data is authentic by comparing the second string of characters with the indication of the string of characters obtained from distributed ledger 120. In this way, destination 115 has assurance that the data was transported without tampering from network node 125(1). Upon verifying the authenticity of the data, destination 115 may, for example, consume the data as normal.

As mentioned, there are at least two example methods by which network node 125(1) may provide the indication of the string of characters to distributed ledger 120 based on unique identifier 150(1) of network node 125(1). In the first example (log-in), destination 115 may verify the identity of network node 125(1) based on the log-in records of distributed ledger 120. The HTA of network node 125(1), for example, may store a password which network node 125(1) uses to log-in to distributed ledger 120. Storing the password in the HTA prevents the password from being lost or stolen. Rather than passing the identity of network node 125(1) with every piece of the data, or repeatedly signing the data with the identity of network node 125(1), network node 125(1) may instead log-in to distributed ledger 120 once. Thereafter, any data pushed to distributed ledger 120 from network node 125(1) may be pushed via the logged-in account. As such, this data may be immutably associated with the identity of network node 125(1), which was previously used to log into distributed ledger 120. Destination 115 may confirm the identity of network node 125(1) in any number of ways, for example with a local library identifying one or more network nodes that are approved for logging into distributed ledger 120. This allows for trust in the identity of network node 125(1) because only the local HTA enables logging in to distributed ledger 120 as network node 125(1).

In the second example (encryption), the encrypted string may be decrypted with a public key provided by the local HTA of network node 125(1). The public key may be shared/distributed and made readily available without compromising the security of system 100. After receiving the encrypted string from distributed ledger 120, destination 115 may decrypt the encrypted string and compare that decrypted string to the second string produced by destination 115 based on the data in network packet 130. If the newly calculated string matches what is posted to distributed ledger 120 or the decrypted string, the user is assured that the data has not been modified.

In addition to identifying network node 125(1) as having handled the received data, destination 115 may also determine whether network node 125(1) was expected to handle that data. There are many possible examples by which destination 115 may make this determination. In one example, a list of device identifiers, names, and locations may be made public (e.g., publicly posted). In another example, the list is shared privately among participating parties/devices. Destination 115 may, for example, determine that network node 125(1) was expected to handle the received data based on network node 125(1) being present on the list. Such a list may be publicly or privately shared by any suitable mechanism(s).

In yet another example, destination 115 may expect to consistently receive certain data (e.g., specified type(s) of data or data within a preset range) from a particular device (e.g., network node 125(1)). If the data is outside expected parameters (e.g., type or range), or passed through a new, different, or unrecognized device, destination 115 may determine whether the data is authentic (e.g., trustworthy). If destination 115 determines that the data is not authentic, destination 115 may flag the data as such, provide a notification/alert to a network administrator or other network monitoring entity, etc. Otherwise, destination 115 may consume the data as normal.

Figure 2:
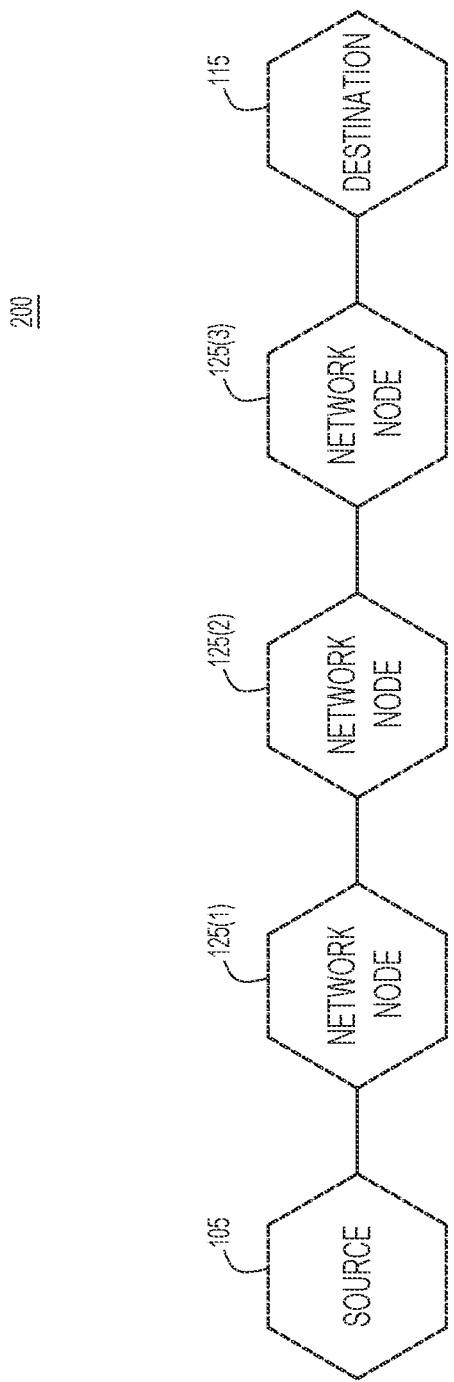
FIG. 2 illustrates a directed graph representing a system configured to perform authentication of data in a network packet using a distributed ledger, according to an example embodiment.

FIG. 2 illustrates an example directed graph 200 representing system 100. Directed graph 200 shows the path taken by network packet 130 from source 105 to destination 115. Representing system 100 as directed graph 200 may be useful in determining and/or exploiting the network topology (e.g., branching) of system 100 to transport network packet 130 from source 105 to destination 115.

Figure 3:
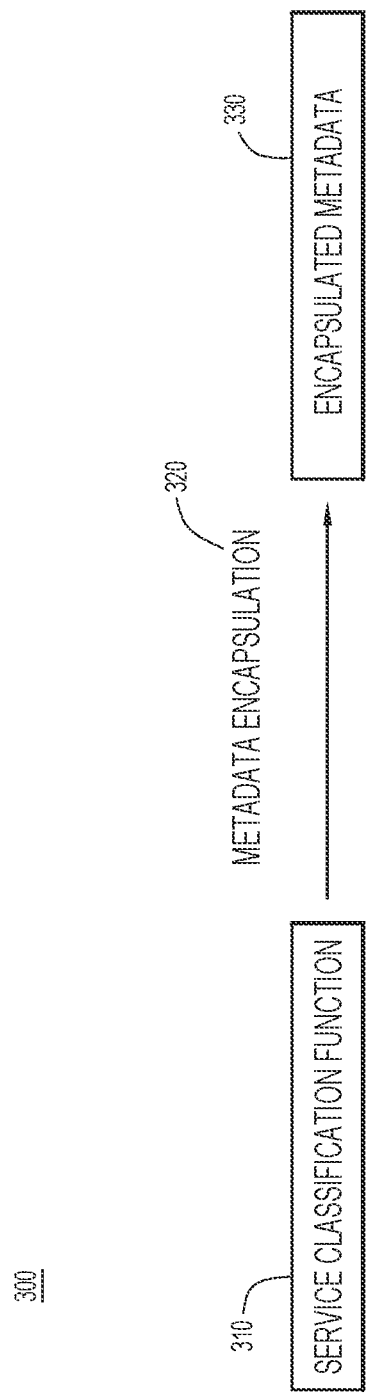
FIG. 3 illustrates a functional diagram for encapsulation of metadata in a network packet, according to an example embodiment.

FIG. 3 illustrates an example functional diagram 300 for encapsulation of metadata in a network packet. Network node 125(1) may include service classification function 310 that performs metadata encapsulation 320 to produce encapsulated metadata 330. The metadata may include the indication of the string of characters and the indication of the time, both of which network node 125(1) may insert as metadata into network packet 130. Encapsulated metadata 330 may represent the metadata stored in network packet 130.

There are many possible embodiments for performing metadata encapsulation 320. Specific networking constructs may allow for carrying a container, and in particular using Segment Routing for IPv6 (SRv6) and the Network Service Header (NSH). Further, a data container structure may be used by various encapsulations. The metadata may be stored in Network Time Protocol (NTP) format, for example. For SRv6, an opaque container Type-Length-Value (TLV) may be used. For NSH, two TLVs in metadata Type 2 may be used. Other methods can also be used, such as User Datagram Protocol (UDP) trailer.

Figure 4:
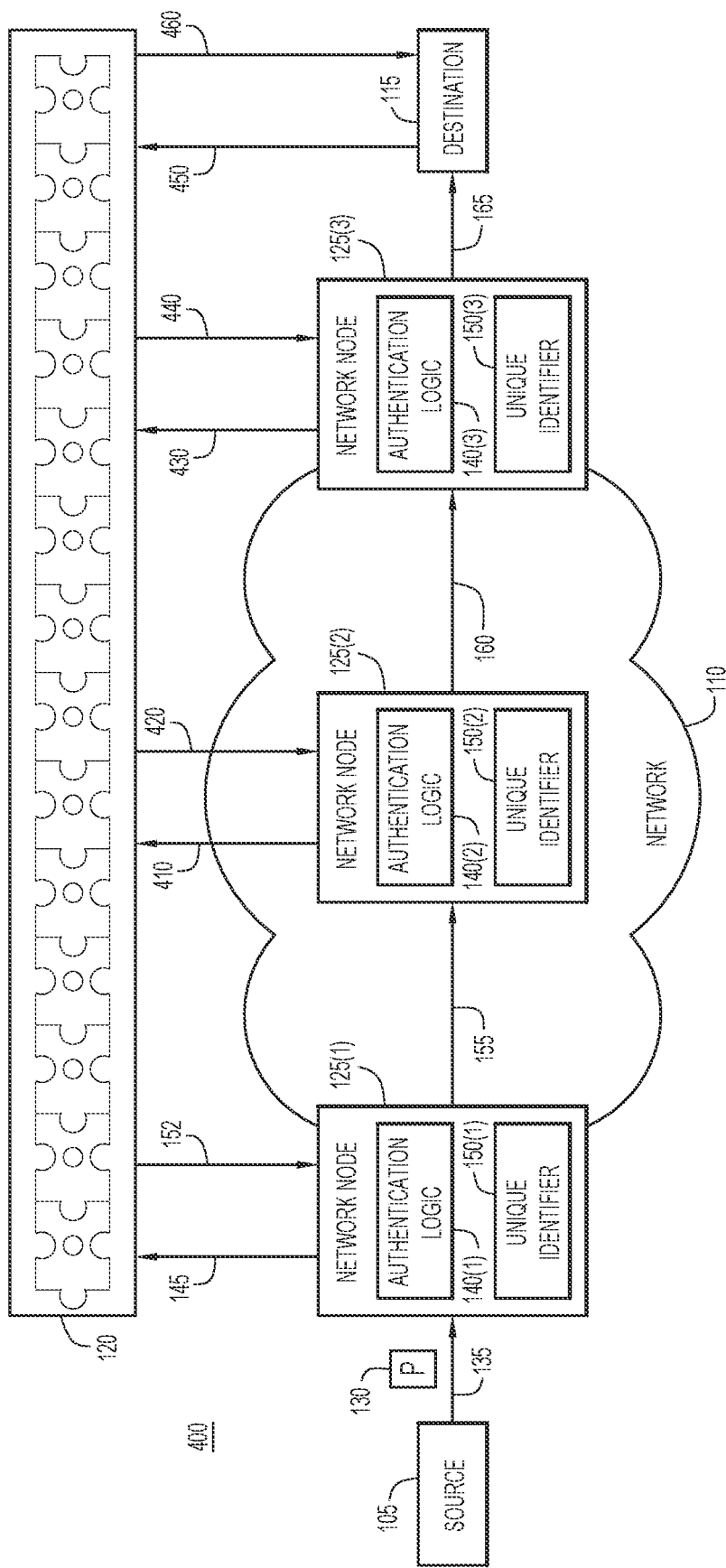
FIG. 4 illustrates a system configured to perform nested authentication of data using a distributed ledger, according to an example embodiment.

FIG. 4 illustrates system 400 configured to perform nested authentication of data. System 400 may be similar to system 100, but now network node 125(2) includes authentication logic 140(2) and unique identifier 150(2), and network node 125(3) includes authentication logic 140(3) and unique identifier 150(3). Unique identifiers 150(2) and 150(3) may be similar to unique identifier 150(1), and authentication logic 140(2) and 140(3) may cause networks nodes 125(2) and 125(3) to perform similar operations as authentication logic 140(1). In particular, the indication of the string of characters is generated and provided to distributed ledger 120 not only at network node 125(1), but also at network nodes 125(2) and 125(3). This allows system 400 to generate a provenance trail for the data in network packet 130.

In one example, after inserting the indication of the (first) string of characters and the indication of the (first) time into network packet 130, network node 125(1) provides network packet 130 to network node 125(2) at 155. Upon obtaining network packet 130, network node 125(2) performs a second deterministic mathematical computation (e.g., second hash computation) on the data to produce a second string of characters (e.g., second digest) derived from the data, and inserts an indication of the second string of characters into network packet 130. Furthermore, at 410, network node 125(2) provides the indication of the second string of characters to distributed ledger 120 based on unique identifier 150(2) of network node 125(2). In a first example, network node 125(2) may establish a connection to distributed ledger 120 using unique identifier 150(2) and provide the second string of characters to distributed ledger 120. In a second example, network node 125(2) may encrypt the second string of characters using unique identifier 150(2) to produce a second encrypted string of characters and provide the second encrypted string of characters to distributed ledger 120.

Upon receiving the indication of the string of characters, distributed ledger 120 stores the indication of the second string of characters and records an indication of a second time at which the indication of the second string of characters was stored in distributed ledger 120 (e.g., a timestamp). In the first example (using unique identifier 150(2) for log-in credentials), distributed ledger 120 also stores an identification of network node 125(2) as having provided the second string of characters to distributed ledger 120 based on unique identifier 150(2) (e.g., based on the log-in credentials).

At 420, network node 125(2) obtains, from distributed ledger 120, the indication of the second time at which the indication of the second string of characters was stored in distributed ledger 120. The indication of the second time may be the timestamp itself or an address identifying a location in distributed ledger 120 at which the second time is stored in distributed ledger 120. The indication of the second string of characters may be stored at the same location as the second time. In one example, the address is a block address of a blockchain. Network node 125(2) may insert the indication of the second time into network packet 130. Thus, at this stage, network packet 130 includes the indications of the first and second strings of characters and the indications of the first and second times at which the indications of the first and second strings of characters were stored in distributed ledger 120. Distributed ledger 120 includes the indications of the first and second strings of characters.

After inserting the indication of the second string of characters and the indication of the second time into network packet 130, network node 125(2) provides network packet 130 towards destination 115. In this example, at 160 network node 125(2) provides network packet 130 to network node 125(3). Upon obtaining network packet 130, network node 125(3) performs a third deterministic mathematical computation (e.g., third hash computation) on the data to produce a third string of characters (e.g., third digest) derived from the data, and inserts an indication of the third string of characters into network packet 130. Furthermore, at 430, network node 125(3) provides the indication of the third string of characters to distributed ledger 120 based on unique identifier 150(3) of network node 125(3). In a first example, network node 125(3) may establish a connection to distributed ledger 120 using unique identifier 150(3) and provide the third string of characters to distributed ledger 120. In a second example, network node 125(3) may encrypt the third string of characters using unique identifier 150(3) to produce a third encrypted string of characters and provide the third encrypted string of characters to distributed ledger 120.

Upon receiving the indication of the third string of characters, distributed ledger 120 stores the indication of the third string of characters and records an indication of a third time at which the indication of the third string of characters was stored in distributed ledger 120 (e.g., a timestamp). In the first example (using unique identifier 150(3) for log-in credentials), distributed ledger 120 also stores an identification of network node 125(3) as having provided the third string of characters to distributed ledger 120 based on unique identifier 150(3) (e.g., based on the log-in credentials).

At 440, network node 125(3) obtains, from ledger 120, the indication of the third time at which the indication of the third string of characters was stored in distributed ledger 120. The indication of the third time may be the timestamp itself or an address identifying a location in distributed ledger 120 at which the third time is stored in distributed ledger 120. The indication of the third string of characters may be stored at the same location as the third time. In one example, the address is a block address of a blockchain. Network node 125(3) may insert the indication of the third time into network packet 130. Thus, at this stage, network packet 130 includes the indications of the first, second, and third strings of characters and the indications of the first, second, and third times at which the indications of the first, second, and third strings of characters were stored in distributed ledger 120. Distributed ledger 120 includes the indications of the first, second, and third strings of characters.

At 165, network node 125(3) provides network packet 130 towards destination 115. Destination 115 obtains network packet 130 from network node 125(3) and extracts the indication of the first, second, and third times from network packet 130. If the indication of the first, second, or third time in the network packet 130 is an address, destination 115 may obtain that time from distributed ledger 120. Thus, destination 115 has assurance of the first, second, and third times at which the data was stored in distributed ledger 120, which can be useful for verifying the authenticity of the data. For example, the first time may approximate the time at which the data arrived at network node 125(1), the second time may approximate the time at which the data arrived at network node 125(2), and the third time may approximate the time at which the data arrived at network node 125(3).

Destination 115 may also perform fourth, fifth, and sixth deterministic mathematical computations (e.g., fourth, fifth, and sixth hash computations) on the data to produce fourth, fifth, and sixth strings of characters (e.g., fourth, fifth, and sixth digests) derived from the data. Further, at 450, destination 115 may request the indication of the first, second, and third strings of characters from distributed ledger 120, and at 460 destination 115 may obtain the indication of the fourth, fifth, and sixth strings of characters from distributed ledger 120. Thus, destination 115 may determine whether the data is authentic by comparing the fourth string of characters with the indication of the first string of characters obtained from distributed ledger 120; comparing the fifth string of characters with the indication of the second string of characters obtained from distributed ledger 120; and comparing the sixth string of characters with the indication of the third string of characters obtained from distributed ledger 120. In this way, destination 115 has assurance that the data was transported without tampering at each of network nodes 125(1)-125(3). Upon verifying the authenticity of the data, destination 115 may, for example, consume the data as normal.

Nesting respective strings of characters in distributed ledger 120 enables destination 115 to have assurance that multiple network nodes in the network path taken by network packet 130 (here, network nodes 125(1)-125(3)) handled the data appropriately. This may enable not only granular detection of data tampering (e.g., recording where a specific piece of data has been), but also records when and where data alterations occurred. In one example, one or more network nodes in the network path (e.g., network nodes 125(2) and/or 125(3)) may verify the authenticity of the data (e.g., before providing network packet 130 towards destination 115). In another example, network node 125(2) may be further configured to modify (e.g., alter or add to) the data before performing the second deterministic mathematical computation. Destination 115 may thus have assurance of the data that was delivered to network node 125(1) (e.g., signaled by the first string of characters produced by network node 125(1)) as well as assurance of the identity, time, and content for the modifications made by network device 125(2).

One specific example is a supply chain for a box of ten widgets to be painted green. Here, the widget manufacturer may deliver the box of ten widgets to a painter. The widget manufacturer may also send data indicating that the box has ten widgets to the painter and provide an indication of the data to a distributed ledger. The painter obtains the box of ten widgets, and receives the indication that the box has ten widgets. Optionally, the painter may verify the authenticity of the data indicating that the box has ten widgets based on the distributed ledger. The painter may paint the widgets green and send the green widgets to an end user. The painter may also alter the data to indicate that the widgets are green, send the altered data, and provide an indication of the data to the distributed ledger. The end user obtains the box of green widgets, and receives the indication that the box has green widgets. Because the indications in the distributed ledger are nested, the end user may determine that the painter painted the ten widgets green at a specified time.

Figure 5:
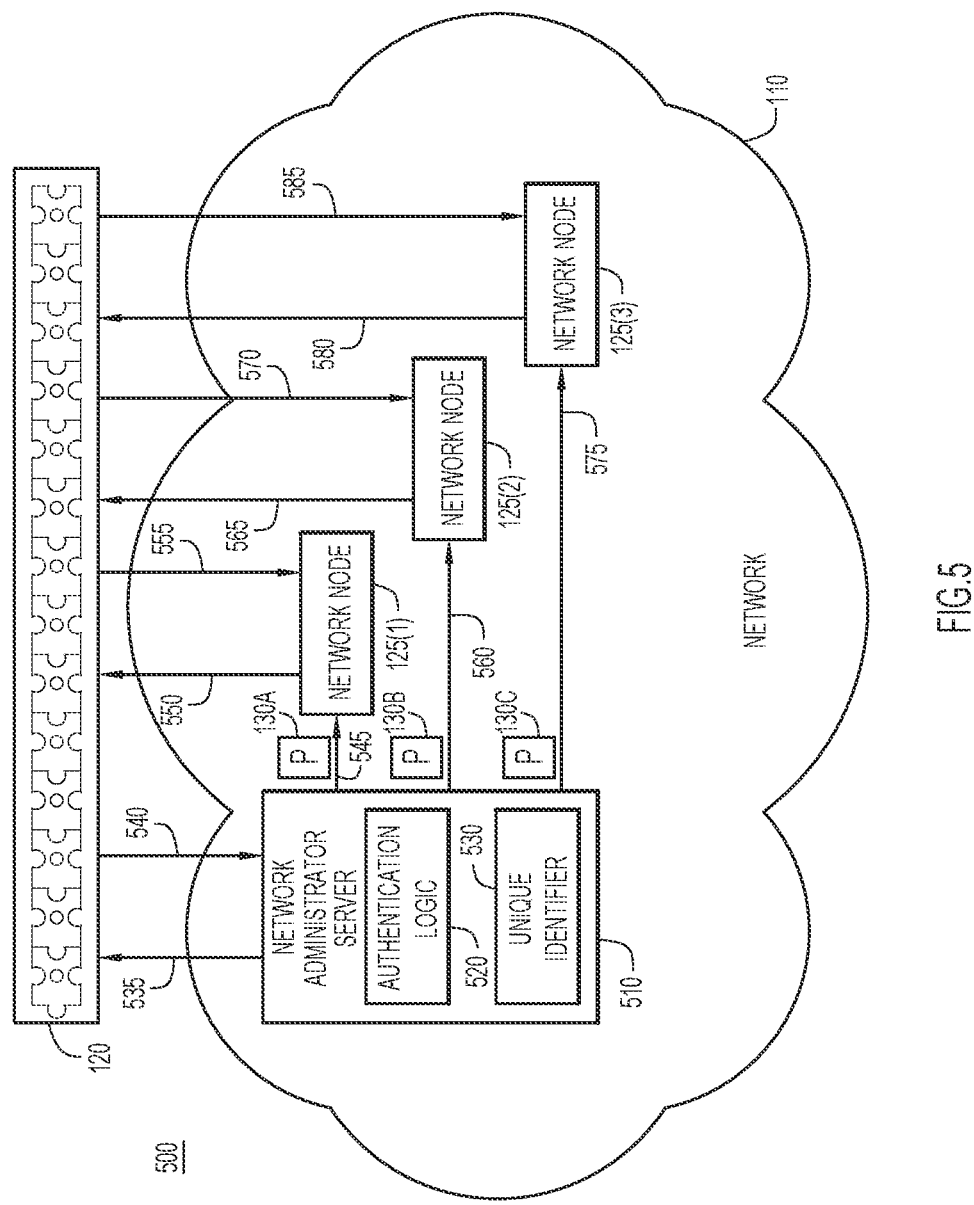
FIG. 5 illustrates a system configured to perform authentication of configuration changes in a network using a distributed ledger, according to an example embodiment.

FIG. 5 illustrates example system 500 configured to perform authentication of configuration changes. System 500 may be similar to system 100, but now includes network entity (e.g., network administrator server) 510 that may be capable of configuring network nodes 125(1)-125(3). Network administrator server 510 may comprise a Network Management Station/System (NMS), a Software Defined Networking (SDN) network controller, a YANG-speaking orchestrator, or an internal data center. A pernicious problem in network administration is verifying and tracking configuration changes. Most systems allow anyone with an administrator password to change the configuration without leaving a record of the change or the time that the change occurred. Accordingly, network administrator server 510 includes authentication logic 520 and unique identifier 530. Authentication logic 520 may be similar to authentication logic 140(1)-140(3) referred to above, and unique identifier 530 may be similar to unique identifiers 150(1)-150(3) referred to above.

Network administrator server 510 may obtain (e.g., generate) network packet 130A that includes network configuration data for network node 125(1). Network administrator server 510 may perform a deterministic mathematical computation on the network configuration data for network node 125(1) to produce a string of characters derived from the network configuration data for network node 125(1). Network administrator server 510 may further insert an indication of the string of characters derived from the network configuration data for network node 125(1) into network packet 130A. At 535, network administrator server 510 provides the indication of the string of characters derived from the network configuration data for network node 125(1) to distributed ledger 120 based on unique identifier 530.

Distributed ledger 120 stores (e.g., in a block of a blockchain) the indication of the string of characters derived from the network configuration data for network node 125(1). Distributed ledger 120 further records an indication of a time at which the indication of the string of characters derived from the network configuration data for network node 125(1) was stored in distributed ledger 120. At 540, network administrator server 510 obtains, from distributed ledger 120, the indication of the time. Network administrator server 510 inserts the indication of the time into network packet 130A and, at 545, provides network packet 130A towards a destination (e.g., network node 125(1), for example via zero or more intermediary devices)).

Network node 125(1) may obtain network packet 130A from network administrator server 510 and extract the indication of the time from network packet 130A. If the indication of the time in the network packet 130A is an address, network node 125(1) may obtain the time from distributed ledger 120. Thus, network node 125(1) has assurance of the time at which the network configuration data was stored in distributed ledger 120, which can be useful for verifying the authenticity of the network configuration data. For example, the time may approximate the time at which network administration server 510 generated the data.

Network node 125(1) may also perform a second deterministic mathematical computation (e.g., a hash computation) on the network configuration data to produce a second string of characters (e.g., a digest) derived from the network configuration data. Further, at 550, network node 125(1) may request the indication of the string of characters from distributed ledger 120, and at 555 network node 125(1) may obtain the indication of the string of characters from distributed ledger 120. Thus, network node 125(1) may determine whether the network configuration data is authentic by comparing the second string of characters with the indication of the string of characters obtained from distributed ledger 120. In this way, network node 125(1) has assurance that the network configuration data was transported without tampering at network administrator server 510.

Upon verifying the authenticity of the network configuration data, network node 125(1) may, for example, consume the network configuration data as normal (e.g., install the configuration). Optionally, network node 125(1) may acknowledge the receipt/installation of new configurations, and store that acknowledgement in distributed ledger 120. This is especially useful when the network configuration data includes a license file enabling new functionality. Distributed ledger 120 maintains a current count of the number of devices (and, possibly, identification of each device) installing that functionality. This may be a valuable tool in license management across traditional trust boundaries. For example, network node 125(1) may sign the received network configuration data with its own identity. Effectively, the network node 125(1) registers itself as the final hop in the provenance trail.

Network administrator server 510 may obtain (e.g., generate) network packet 130B including network configuration data for network node 125(2). Network administrator server 510 may perform a deterministic mathematical computation on the network configuration data for network node 125(2) to produce a string of characters derived from the network configuration data for network node 125(2). Network administrator server 510 may further insert an indication of the string of characters derived from the network configuration data for network node 125(2) into network packet 130B. At 535, network administrator server 510 provides the indication of the string of characters derived from the network configuration data for network node 125(2) to distributed ledger 120 based on unique identifier 530. This may be simultaneous to or at a distinct time from network administrator server 510 providing the string of characters derived from the network configuration data for network node 125(1) to distributed ledger 120 based on unique identifier 530.

Distributed ledger 120 stores the indication of the string of characters derived from the network configuration data for network node 125(2). Distributed ledger 120 further records an indication of a time at which the indication of the string of characters derived from the network configuration data for network node 125(2) was stored in distributed ledger 120. At 540, network administrator server 510 obtains, from distributed ledger 120, the indication of the time. This may be simultaneous to or at a distinct time from network administrator server 510 obtaining the indication of the time at which the indication of the string of characters derived from the network configuration data for network node 125(1) was stored in distributed ledger 120. Network administrator server 510 inserts the indication of the time into network packet 130B and, at 560, provides network packet 130B towards a destination (e.g., network node 125(2), for example via zero or more intermediary devices)).

Network node 125(2) may obtain network packet 130B from network administrator server 510 and extract the indication of the time from network packet 130B. If the indication of the time in the network packet 130B is an address, network node 125(2) may obtain the time from distributed ledger 120. Thus, network node 125(2) has assurance of the time at which the network configuration data was stored in distributed ledger 120, which can be useful for verifying the authenticity of the network configuration data. For example, the time may approximate the time at which the data arrived at network node 125(2).

Network node 125(2) may also perform a second deterministic mathematical computation (e.g., a hash computation) on the network configuration data to produce a second string of characters (e.g., a digest) derived from the network configuration data. Further, at 565, network node 125(2) may request the indication of the string of characters from distributed ledger 120, and at 570 network node 125(2) may obtain the indication of the string of characters from distributed ledger 120. Thus, network node 125(2) may determine whether the network configuration data is authentic by comparing the second string of characters with the indication of the string of characters obtained from distributed ledger 120. In this way, network node 125(2) has assurance that the network configuration data was transported without tampering at network administrator server 510.

Upon verifying the authenticity of the network configuration data, network node 125(2) may, for example, consume the network configuration data as normal (e.g., install the configuration). Optionally, network node 125(2) may acknowledge the receipt/installation of new configurations, and store that acknowledgement in distributed ledger 120. This is especially useful when the network configuration data includes a license file enabling new functionality. Distributed ledger 120 maintains a current count of the number of devices (and, possibly, identification of each device) installing that functionality. This may be a valuable tool in license management across traditional trust boundaries. For example, network node 125(2) may sign the received network configuration data with its own identity. Effectively, the network node 125(2) registers itself as the final hop in the provenance trail.

Network administrator server 510 may obtain (e.g., generate) network packet 130C including network configuration data for network node 125(3). Network administrator server 510 may perform a deterministic mathematical computation on the network configuration data for network node 125(3) to produce a string of characters derived from the network configuration data for network node 125(3). Network administrator server 510 may further insert an indication of the string of characters derived from the network configuration data for network node 125(3) into network packet 130C. At 535, network administrator server 510 provides the indication of the string of characters derived from the network configuration data for network node 125(3) to distributed ledger 120 based on unique identifier 530. This may be simultaneous to or at a distinct time from network administrator server 510 providing the string of characters derived from the network configuration data for network nodes 125(2) and/or 125(3) to distributed ledger 120 based on unique identifier 530.

Distributed ledger 120 stores the indication of the string of characters derived from the network configuration data for network node 125(3). Distributed ledger 120 further records an indication of a time at which the indication of the string of characters derived from the network configuration data for network node 125(3) was stored in distributed ledger 120. At 540, network administrator server 510 obtains, from distributed ledger 120, the indication of the time. This may be simultaneous to or at a distinct time from network administrator server 510 obtaining the indication of the time at which the indication of the string of characters derived from the network configuration data for network nodes 125(2) and/or 125(3) were stored in distributed ledger 120. Network administrator server 510 inserts the indication of the time into network packet 130C and, at 575, provides network packet 130C towards a destination (e.g., network node 125(3), for example via zero or more intermediary devices)).

Network node 125(3) may obtain network packet 130C from network administrator server 510 and extract the indication of the time from network packet 130C. If the indication of the time in the network packet 130C is an address, network node 125(3) may obtain the time from distributed ledger 120. Thus, network node 125(3) has assurance of the time at which the network configuration data was stored in distributed ledger 120, which can be useful for verifying the authenticity of the network configuration data. For example, the time may approximate the time at which the data arrived at network node 125(3).

Network node 125(3) may also perform a second deterministic mathematical computation (e.g., a hash computation) on the network configuration data to produce a second string of characters (e.g., a digest) derived from the network configuration data. Further, at 580, network node 125(3) may request the indication of the string of characters from distributed ledger 120, and at 585 network node 125(3) may obtain the indication of the string of characters from distributed ledger 120. Thus, network node 125(3) may determine whether the network configuration data is authentic by comparing the second string of characters with the indication of the string of characters obtained from distributed ledger 120. In this way, network node 125(3) has assurance that the network configuration data was transported without tampering at network administrator server 510.

Upon verifying the authenticity of the network configuration data, network node 125(3) may, for example, consume the network configuration data as normal (e.g., install the configuration). Optionally, network node 125(3) may acknowledge the receipt/installation of new configurations, and store that acknowledgement in distributed ledger 120. This is especially useful when the network configuration data includes a license file enabling new functionality. Distributed ledger 120 maintains a current count of the number of devices (and, possibly, identification of each device) installing that functionality. This may be a valuable tool in license management across traditional trust boundaries. For example, network node 125(3) may sign the received network configuration data receives with its own identity. Effectively, the network node 125(3) registers itself as the final hop in the provenance trail. Overall, this allows network 110 itself to generate a higher level of assurance that it is configured correctly.

Figure 6:
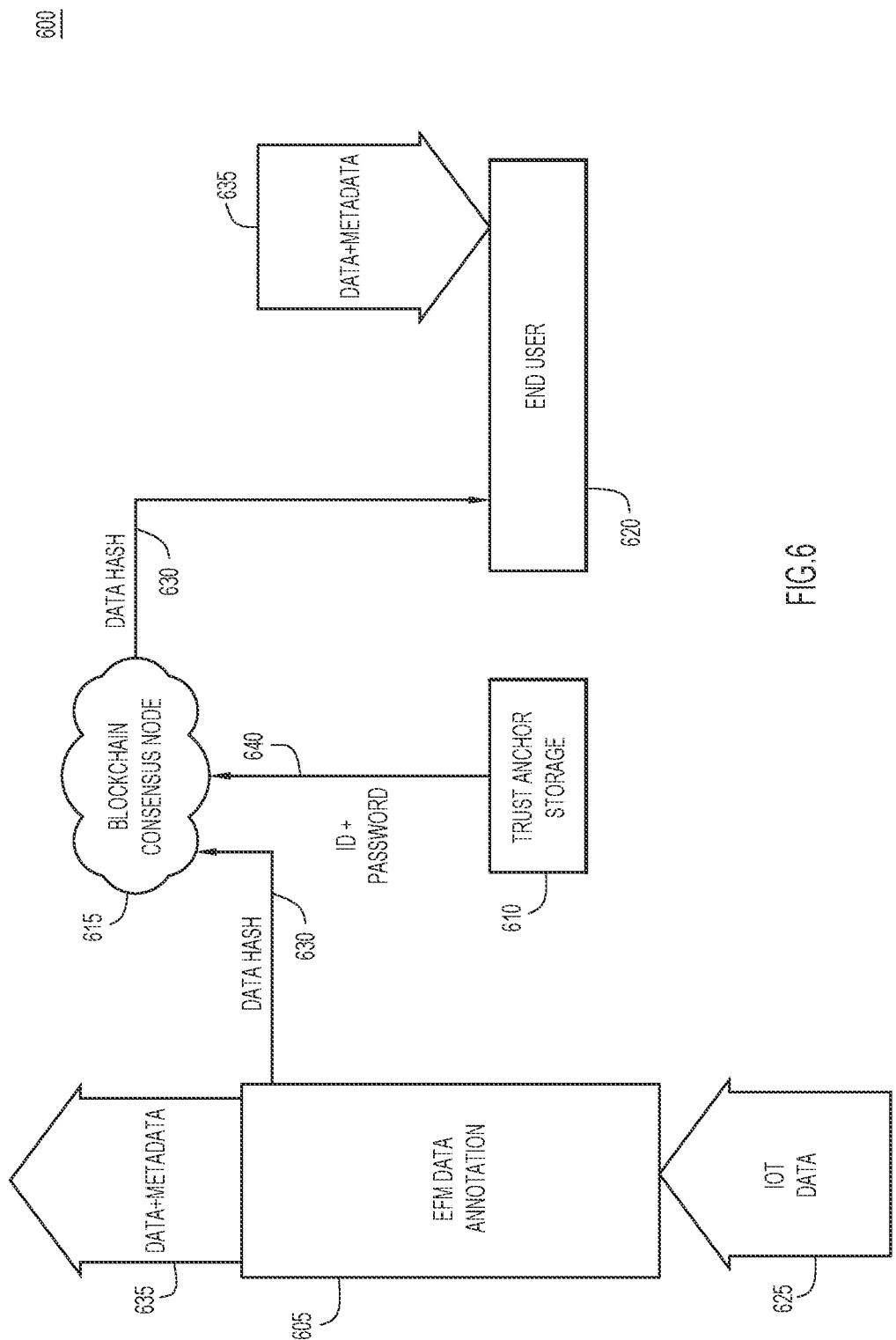
FIG. 6 illustrates a system configured to perform authentication of data in a network packet using a distributed ledger based on a secret unique identifier of a network node in the system, according to an example embodiment.
Figure 7:
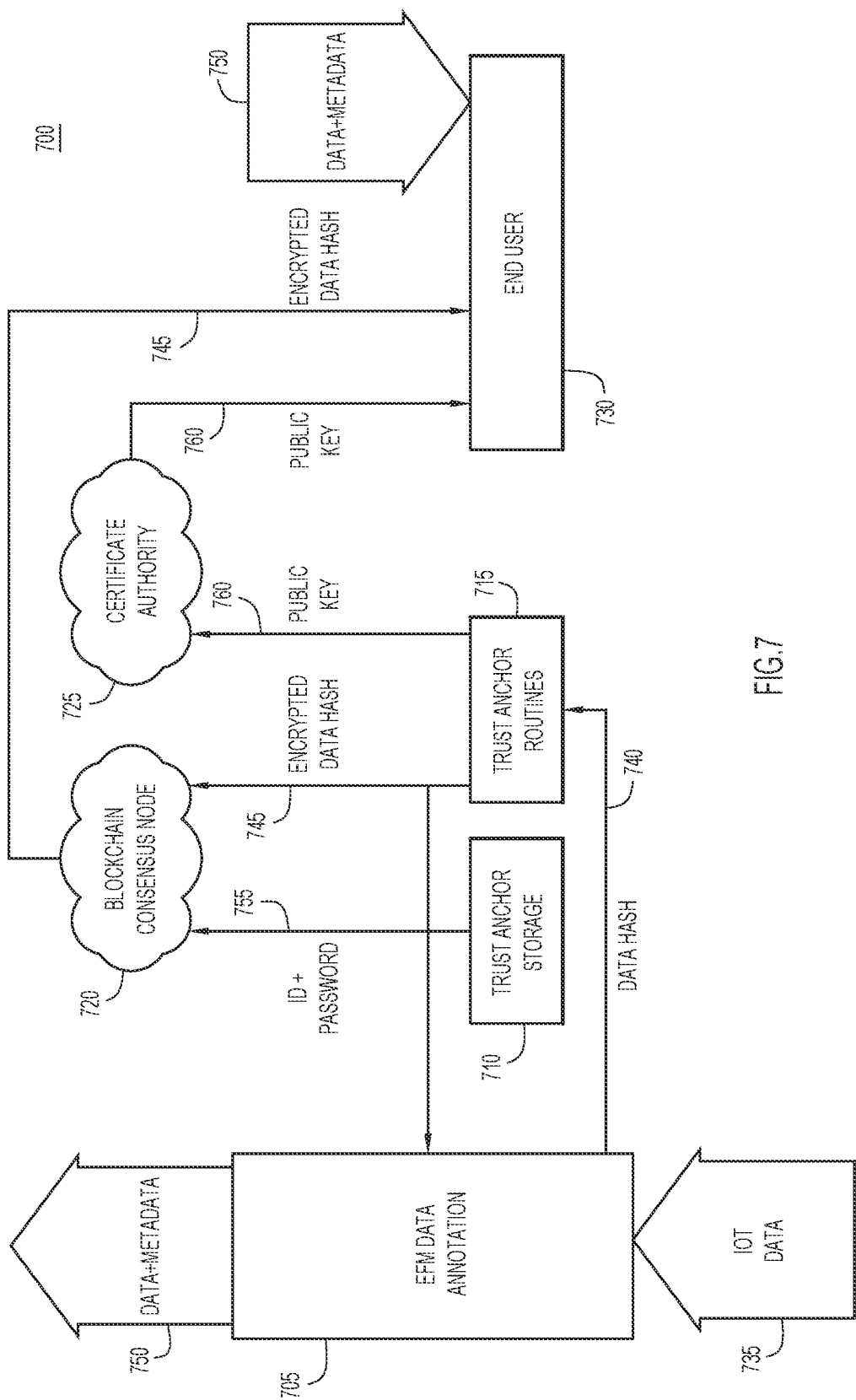
FIG. 7 illustrates another system configured to perform authentication of data in a network packet using a distributed ledger based on a secret unique identifier of a network node in the system, according to an example embodiment.

FIGS. 6 and 7 respectively illustrate example systems 600 and 700 configured to immutably preserve the time, source identity, and content of a data stream. System 600 relies on a blockchain to preserve time, source identity, and content, while system 700 uses the blockchain for time and content, relying on a certificate authority to prove identity. System 600 illustrates using a unique identifier as log-in credentials. In system 600, a unique identifier is used to establish a connection to a blockchain consensus node. Thereafter, all data hashes from the network entity corresponding to the unique identifier are effectively associated with that unique identifier, because the blockchain consensus node records that the data hashes were added by that network entity. Meanwhile, system 700 illustrates using a unique identifier to encrypt a data hash. In this case, the unique identifier is incorporated after the data is hashed. Systems 600 and/or 700 may be helpful depending on the particular use case.

FIG. 6 illustrates an example system 600 configured to perform authentication of data in a network packet using a distributed ledger based on a secret unique identifier of a network node. System 600 includes Edge and Fog Processing Module (EFM) data annotation module 605, trust anchor storage 610, blockchain consensus node 615, and end user

620. EFM data annotation module 605 and trust anchor storage 610 may be included in an edge device (e.g., network node 125(1)). Blockchain consensus node 615 may be similar to distributed ledger 120. End user 620 may be, for example, destination 115, network node 125(1), etc. End user 620 may simply be the next step in the network before the data continues to its final destination.

Upon obtaining IoT data 625, EFM data annotation module 605 adds metadata to IoT data 625 to generate combined data and metadata 635. EFM data annotation module 605 further extracts a chunk of data, hashes that data to produce data hash 630, and sends data hash 630 to blockchain consensus node 615. Trust anchor storage 610 may also send an Identifier (ID) (e.g., router POP ID) and password (e.g., blockchain credentials) 640 to blockchain consensus node 615. End user 630 obtains combined data and metadata 635, hashes the data, and compare the hash to that stored in blockchain consensus node 615. This allows for trust in the content based on the hashes matching and the time at which the hash was written to consensus blockchain node 615. In this way, a user may manually confirm the authenticity of IoT data 625, and any other data from that source may be trusted under the same approval.

FIG. 7 illustrates an example system 700 configured to perform authentication of data in a network packet using a distributed ledger based on a secret unique identifier of a network node. System 700 includes EFM data annotation module 705, trust anchor storage 710, trust anchor routines 715, blockchain consensus node 720, certificate authority 725, and end user 730. EFM data annotation module 705, trust anchor storage 710, trust anchor routines module 715 may be included in an edge device (e.g., network node 125(1)). Blockchain consensus node 720 may be similar to distributed ledger 120. End user 730 may be, for example, destination 115, network node 125(1), etc. End user 730 may simply be the next step in the network before the data continues to its final destination.

Upon obtaining IoT data 735, EFM data annotation module 705 extracts a chunk of data, hashes that data to produce data hash 740, and sends data hash 740 to trust anchor routines module 715. Trust anchor routines module 715 encrypts data hash 740 using a private key of the edge device to produce encrypted data hash 745. This effectively stamps the data hash 740 with the identity of the edge device. In one example, the private key never leaves the Time Based Access Memory (TAM) of the edge device. Trust anchor routines module 715 then sends encrypted data hash 745 to EFM data annotation module 705 and blockchain consensus node 720. EFM data annotation module 705 adds metadata to IoT data 735 to generate combined data and metadata 750. Trust anchor storage 710 also sends ID (e.g., router POP ID) and password (e.g., blockchain credentials) 755 to blockchain consensus node 720. Trust anchor storage routines module 715 also sends public key 760 to a readily available source such as certificate authority 725. In one example, public key 760 never expires.

Upon receiving combined data and metadata 750, end user 730 receives combined data and metadata 750 and requests encrypted data hash 745 from blockchain consensus node 720 and public key 760 from certificate authority 725. End user 730 compares encrypted hash 745 passed with the data to encrypted hash 745 posted on blockchain consensus node 720. This confirms that the data was posted at the asserted time. End user 730 may use public key 760 to decrypt encrypted data hash 745, while also hashing the received data. If the two hashes match, end user 730 can trust both the identity of the data (because the data must have been encrypted with trust anchor storage 710 on the edge device) and in the content of the data (because the hashes match).

Figure 8:
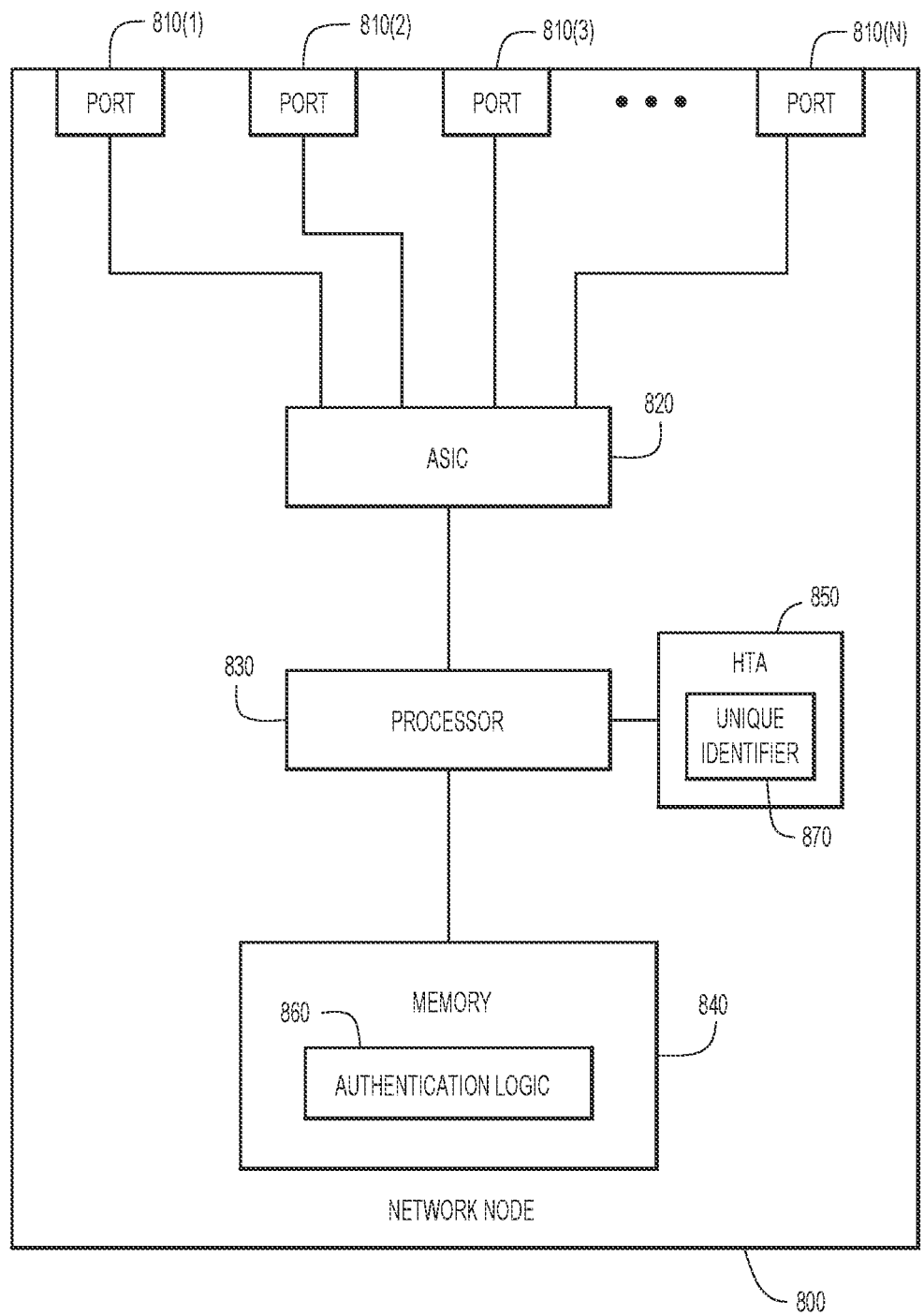
FIG. 8 illustrates a block diagram of a network node configured to perform techniques to enable authentication of data in a network packet using a distributed ledger, according to an example embodiment.

FIG. 8 illustrates a block diagram of a network node 800 (e.g., network node 125(1)) that is configured to implement techniques presented herein. Network node 800 includes a network interface in the form of a plurality of network ports 810(1)-810(N) that enable communications over a network, an Application Specific Integrated Circuit (ASIC) 820 that performs network processing functions, one or more processors 830 (e.g., microprocessors or microcontrollers), memory 840, and HTA 850. Memory 840 includes instructions for authentication logic 860 (e.g., authentication logic 140(1)). HTA 850 includes unique identifier 870 (e.g., unique identifier 150(1)).

Memory 840 may include read only memory (ROM), random access memory (RAM), magnetic disk storage media devices, optical storage media devices, flash memory devices, electrical, optical, or other physical/tangible memory storage devices. Thus, in general, the memory 840 may comprise one or more tangible (non-transitory) computer readable storage media (e.g., a memory device) encoded with software comprising computer executable instructions and when the software is executed (e.g., by the one or more processors 830) it is operable to perform operations described herein. In particular, the memory 840 includes instructions for authentication logic 860 that, when executed, enables network node 800 to perform operations described herein.

Figure 9:
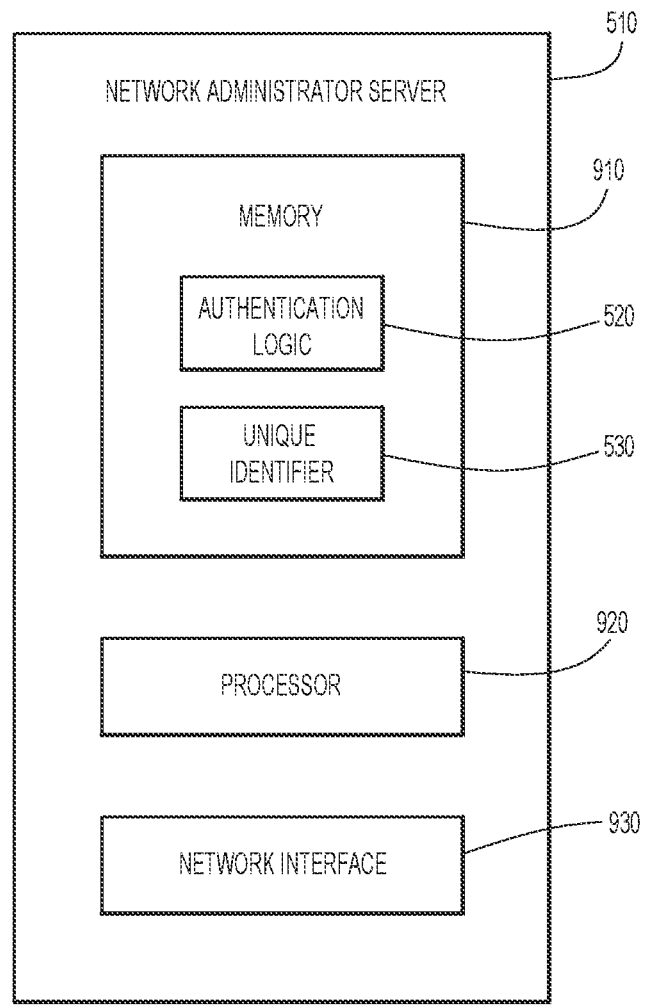
FIG. 9 illustrates a block diagram of a server configured to perform techniques to enable authentication of data in a network packet using a distributed ledger, according to an example embodiment.

FIG. 9 illustrates a simplified block diagram of network administrator server 510. In this example, network administrator server 510 includes memory 910 that stores instructions for authentication logic 520 and unique identifier 530, one or more processors 920, and network interface 930. The one or more processors 920 are configured to execute instructions stored in the memory 910 for authentication logic 520. When executed by the one or more processors 920, authentication logic 520 causes network administrator server 510 to perform operations described herein. Network interface 930 is a network interface card (or multiple instances of such a device) or other network interface device that enables network communications on behalf of network administrator server 510 for sending and receiving messages.

Memory 910 may be read only memory (ROM), random access memory (RAM), magnetic disk storage media devices, optical storage media devices, flash memory devices, electrical, optical, or other physical/tangible memory storage devices. Thus, in general, memory 910 may be one or more tangible (non-transitory) computer readable storage media (e.g., a memory device) encoded with software comprising computer executable instructions and when the software is executed (by the processor 920) it is operable to perform operations described herein.

Figure 10:
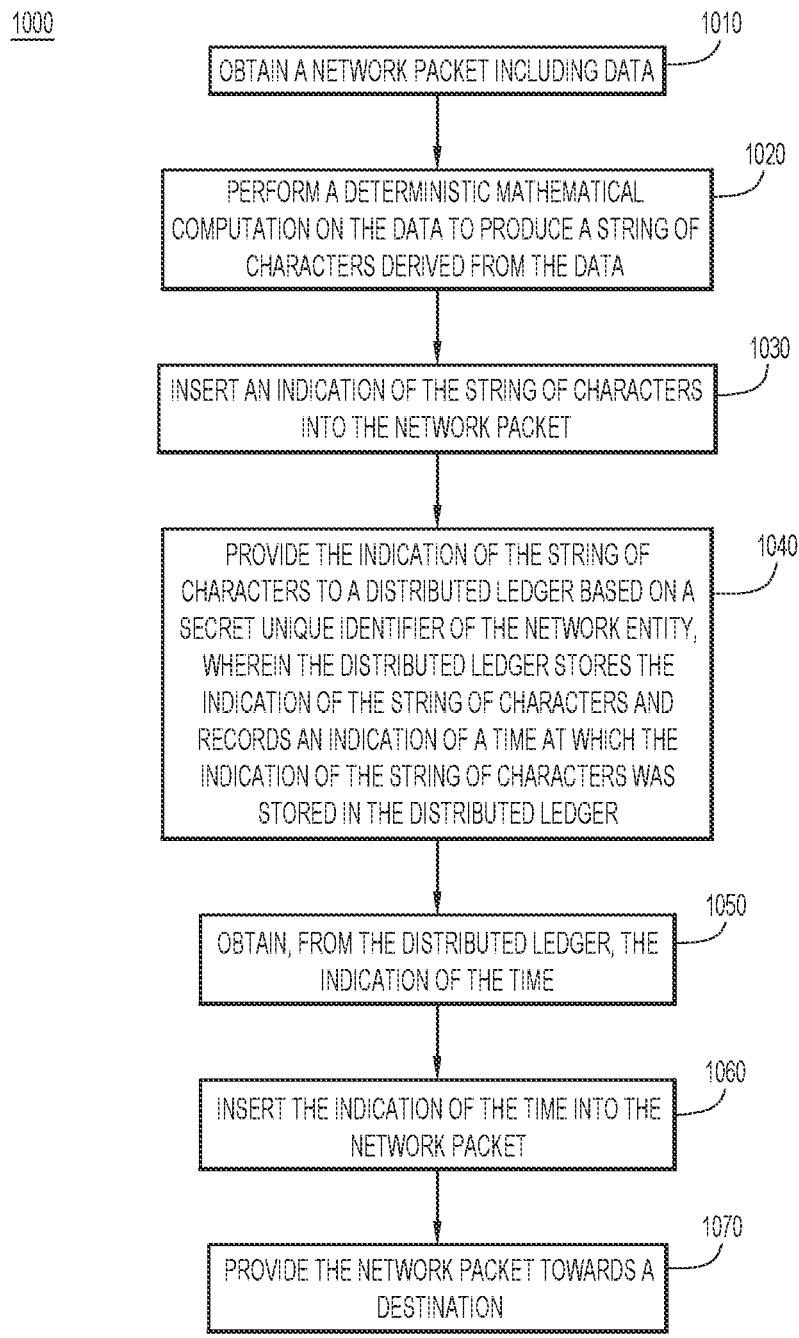
FIG. 10 illustrates a flowchart of a method to enable authentication of data in a network packet using a distributed ledger, according to an example embodiment.

FIG. 10 illustrates a flowchart of an example method 1000 to enable authentication of data in a network packet using a distributed ledger. Method 100 may be performed by a network entity (e.g., network node 125(1), network administrator server 510, etc.). At 1010, the network entity obtains a network packet including data. At 1020, the network entity performs a deterministic mathematical computation on the data to produce a string of characters derived from the data. At 1030, the network entity inserts an indication of the string of characters into the network packet.

At 1040, the network entity provides the indication of the string of characters to a distributed ledger based on a secret unique identifier of the network entity. The distributed ledger stores the indication of the string of characters and records an indication of a time at which the indication of the string of characters was stored in the distributed ledger. At 1050, the network entity obtains, from the distributed ledger, the indication of the time. At 1060, the network entity inserts the indication of the time into the network packet. At 1070, the network entity provides the network packet towards a destination.

Techniques described herein may inherently permit detection of tampering at the data layer. These techniques may be secure because the edge device serves as the first contact with the source. The Smart Install exploit, for example, relies on loading a false configuration or image by pretending to be a trusted source. These techniques would detect this exploit because the verification of that trusted source would be widely distributed and therefore very difficult to fake. In at least one example, distributed ledger 120 includes a one-way hash of the data. If only the hash is available, there is no practical way to reverse engineer and produce the data. If the fingerprint does not match the blockchain, the destination knows that the data has been altered and should not be trusted.

In the case of brown field IoT devices, huge expensive machines are so old that they cannot be programmed directly. This solution does not require any alteration of the source itself, but may still provide assurance for the data from these legacy devices. Furthermore, instead of a network acting like a series of anonymous tubes for the Internet, this solution places identity into the network itself, and takes advantage of the physical footprint and HTA to provide assurance for data passing over the network. It will be appreciated that techniques described herein may be performed for one or more (or all) network packets in a flow sent via an edge network node into a network.

For some internal systems, the distributed ledger may be replaced with a standard database. The data repository may be a standard database, local or cloud bases, or even a blockchain, as desired. Moreover, any unique identifier substitute may be used, for example a standard public/private key pair. Notably, the sources may be mixed. Where available, HTA may be used, but as data passes over non-compatible devices, other identity sources may be used. This enables creating provenance trails of data, even outside of a particular service provider's network. Nodes of that service provider may be flagged as untrustworthy, and may not be able to prove all or some of the same pieces of information.

This solution allows network administrators to bootstrap in to the identity of the network, and provide identity, time, and content assurance for unsecured or unknown devices directly at the point where they touch the network. At least example use cases are provided. The first is network integrity, which provides immutable evidence that critical network infrastructure has not been altered. This also provides forensic evidence of when and where tampering or other failures occur. The second is data integrity, which is focused on eliminating IoT data manipulation, particularly in critical infrastructure. Techniques allow for assurance across traditional trust boundaries. This also maintains data privacy and confidentiality, as only hashes are actually stored on the blockchain.

In the case of supply chain data, the physical origin of the data provides insight into physical tampering and counterfeiting. For example, if a data entry is created which indicates that one-hundred widgets were created in Factory A in May, and it is signed as passing over the Factory A router in May, it is far more trustworthy than if an audit reveals that the same data was actually entered from a router in Factory B in June. Even though the data itself looks exactly the same, the provenance of the data allows for detection of potential tampering.

It will be appreciated that the specific implementation may varying depending on the particular system. For example, arrangements may be chained together to form audible trails. In particular, a network entity may be a source for one process, a destination for another, and even the network assurance layer, all at the same time. In this way, a network node may all provide assurance for the configuration of all the others, creating an assured network that then can be trusted to verify data passing over the network.

Moreover, depending on the particular use case, the solution may be configured to provide assurance at different levels. At the lowest level, the solution may monitor a stream of packets, and hash those together as data at regular intervals, attempting to provide assurance for any and all data passing over the network. Alternatively, the system may be configured to operate on the basis of certain command packets, which tell the system to start and stop collecting packets for a hash. The configuration may indicate specific sources or destinations, allowing the system to provide selective assurance for the data passing over the device. Additionally, an insertion marker may be provided, which instructs the system to perform a packet insertion operation and insert the metadata directly into the packet stream. Finally, the system may be configured for higher level Application Programming Interface (API) interactions. In this case, the source device interacts with the assurance software directly, sending the data that needs assurance as a message, and receiving back the data and metadata for further processing.

In one form, a method is provided. The method comprises: at a network entity: obtaining a network packet including data; performing a deterministic mathematical computation on the data to produce a string of characters derived from the data; inserting an indication of the string of characters into the network packet; providing the indication of the string of characters to a distributed ledger based on a secret unique identifier of the network entity, wherein the distributed ledger stores the indication of the string of characters and records an indication of a time at which the indication of the string of characters was stored in the distributed ledger; obtaining, from the distributed ledger, the indication of the time; inserting the indication of the time into the network packet; and providing the network packet towards a destination.

In one example, providing the indication of the string of characters to the distributed ledger based on the secret unique identifier includes: establishing a connection to the distributed ledger using the secret unique identifier; and providing the string of characters to the distributed ledger, wherein the distributed ledger stores an identification of the network entity as having provided the string of characters to the distributed ledger based on the secret unique identifier. In another example, providing the indication of the string of characters to the distributed ledger based on the secret unique identifier of the network entity includes: encrypting the string of characters using the secret unique identifier to produce an encrypted string of characters; and providing the encrypted string of characters to the distributed ledger.

In yet another example, the indication of the time is an address identifying a location in the distributed ledger at which the time is stored in the distributed ledger, the method further comprising: at the network entity: inserting the address into the network packet. In still another example, the data is network configuration data for the destination. In yet another example, the deterministic mathematical computation is a hash computation and the string of characters is a digest. In still another example, the distributed ledger is a blockchain.

In yet another example, providing the network packet towards the destination includes providing the network packet to a second network entity, wherein the second network entity is configured to: obtain the network packet; perform a second deterministic mathematical computation on the data to produce a second string of characters derived from the data; insert an indication of the second string of characters into the network packet; provide the indication of the second string of characters to the distributed ledger based on a secret unique identifier of the second network entity, wherein the distributed ledger records an indication of a second time at which the second string of characters was stored in the distributed ledger; obtain, from the distributed ledger, the indication of the second time; insert the indication of the second time into the network packet; and provide the network packet towards the destination. In a further example, the second network entity is further configured to modify the data before performing the second deterministic mathematical computation.

In yet another example, the destination of the network packet is configured to: obtain the network packet; extract the indication of the time from the network packet; perform a second deterministic mathematical computation on the data to produce a second string of characters derived from the data; obtain, from the distributed ledger, the indication of the string of characters; and determine whether the data is authentic by comparing the second string of characters with the indication of the string of characters obtained from the distributed ledger.

In another form, an apparatus is provided. The apparatus comprises: a memory configured to store a secret unique identifier of the apparatus; and one or more processors coupled to the memory, wherein the one or more processors are configured to: obtain a network packet including data; perform a deterministic mathematical computation on the data to produce a string of characters derived from the data; insert an indication of the string of characters into the network packet; provide the indication of the string of characters to a distributed ledger based on the secret unique identifier, wherein the distributed ledger stores the indication of the string of characters and records an indication of a time at which the indication of the string of characters was stored in the distributed ledger; obtain, from the distributed ledger, the indication of the time; insert the indication of the time into the network packet; and provide the network packet towards a destination.

In another form, one or more non-transitory computer readable storage media are provided. The non-transitory computer readable storage media are encoded with instructions that, when executed by a processor of a network entity, cause the processor to: obtain a network packet including data; perform a deterministic mathematical computation on the data to produce a string of characters derived from the data; insert an indication of the string of characters into the network packet; provide the indication of the string of characters to a distributed ledger based on a secret unique identifier of the network entity, wherein the distributed ledger stores the indication of the string of characters and records an indication of a time at which the indication of the string of characters was stored in the distributed ledger; obtain, from the distributed ledger, the indication of the time; insert the indication of the time into the network packet; and provide the network packet towards a destination.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a network entity:
        obtaining a network packet including data;
        performing a first deterministic mathematical computation on the data to produce a first string of characters derived from the data;
        inserting an indication of the first string of characters into the network packet;
        providing the indication of the first string of characters to a distributed ledger based on a secret unique identifier of the network entity, wherein the distributed ledger stores the indication of the first string of characters and records an indication of a time at which the indication of the first string of characters was stored in the distributed ledger;
        obtaining, from the distributed ledger, the indication of the time;
        inserting the indication of the time into the network packet; and
        providing the network packet towards a destination of the network packet configured to obtain the network packet, extract the indication of the time from the network packet, perform a second deterministic mathematical computation on the data to produce a second string of characters derived from the data, obtain the indication of the first string of characters from the distributed ledger, and determine whether the data is authentic by comparing the second string of characters with the first string of characters.

2. The method of claim 1, wherein providing the indication of the first string of characters to the distributed ledger based on the secret unique identifier includes:
    establishing a connection to the distributed ledger using the secret unique identifier; and
    providing the first string of characters to the distributed ledger, wherein the distributed ledger stores an identification of the network entity as having provided the first string of characters to the distributed ledger based on the secret unique identifier.

3. The method of claim 1, wherein providing the indication of the first string of characters to the distributed ledger based on the secret unique identifier of the network entity includes:
    encrypting the first string of characters using the secret unique identifier to produce an encrypted string of characters; and
    providing the encrypted string of characters to the distributed ledger.

4. The method of claim 1, wherein the indication of the time is an address identifying a location in the distributed ledger at which the time is stored in the distributed ledger, the method further comprising:
    at the network entity:
        inserting the address into the network packet.

5. The method of claim 1, wherein providing the network packet towards the destination includes providing the network packet to a second network entity, wherein the second network entity is configured to:
  obtain the network packet;
  perform a third deterministic mathematical computation on the data to produce a third string of characters derived from the data;
  insert an indication of the third string of characters into the network packet;
  provide the indication of the third string of characters to the distributed ledger based on a secret unique identifier of the second network entity, wherein the distributed ledger records an indication of a second time at which the third string of characters was stored in the distributed ledger;
  obtain, from the distributed ledger, the indication of the second time;
  insert the indication of the second time into the network packet; and
  provide the network packet towards the destination.

6. The method of claim 5, wherein the second network entity is further configured to modify the data before performing the third deterministic mathematical computation.

7. The method of claim 1, wherein obtaining the network packet including the data comprises:
  obtaining the network packet including network configuration data for the destination.

8. The method of claim 1, wherein the first deterministic mathematical computation is a hash computation and the first string of characters is a digest.

9. The method of claim 1, wherein the distributed ledger is a blockchain.

10. An apparatus comprising:
  a memory configured to store a secret unique identifier of the apparatus; and
  one or more processors coupled to the memory, wherein the one or more processors are configured to:
    obtain a network packet including data;
    perform a first deterministic mathematical computation on the data to produce a first string of characters derived from the data;
    insert an indication of the first string of characters into the network packet;
    provide the indication of the first string of characters to a distributed ledger based on the secret unique identifier, wherein the distributed ledger stores the indication of the first string of characters and records an indication of a time at which the indication of the first string of characters was stored in the distributed ledger;
    obtain, from the distributed ledger, the indication of the time;
    insert the indication of the time into the network packet; and
    provide the network packet towards a destination of the network packet configured to obtain the network packet, extract the indication of the time from the network packet, perform a second deterministic mathematical computation on the data to produce a second string of characters derived from the data, obtain the indication of the first string of characters from the distributed ledger, and determine whether the data is authentic by comparing the second string of characters with the first string of characters.

11. The apparatus of claim 10, wherein the one or more processors are further configured to:
  establish a connection to the distributed ledger using the secret unique identifier; and
  provide the first string of characters to the distributed ledger, wherein the distributed ledger stores an identification of the apparatus as having provided the first string of characters to the distributed ledger based on the secret unique identifier.

12. The apparatus of claim 10, wherein the one or more processors are further configured to:
  encrypt the first string of characters using the secret unique identifier to produce an encrypted string of characters; and
  provide the encrypted string of characters to the distributed ledger.

13. The apparatus of claim 10, wherein the one or more processors are further configured to provide the network packet to a second apparatus, and wherein the second apparatus is configured to:
  obtain the network packet;
  modify the data;
  after modifying the data, perform a third deterministic mathematical computation on the data to produce a third string of characters derived from the data;
  insert an indication of the third string of characters into the network packet;
  provide the indication of the third string of characters to the distributed ledger based on a secret unique identifier of the second apparatus, wherein the distributed ledger records an indication of a second time at which the third string of characters was stored in the distributed ledger;
  obtain, from the distributed ledger, the indication of the second time;
  insert the indication of the second time into the network packet; and
  provide the network packet towards the destination.

14. The apparatus of claim 10, wherein the indication of the time is an address identifying a location in the distributed ledger at which the time is stored in the distributed ledger, and wherein the one or more processors are further configured to:
  insert the address into the network packet.

15. The apparatus of claim 10, wherein the first deterministic mathematical computation is a hash computation and the first string of characters is a digest.

16. The apparatus of claim 10, wherein the distributed ledger is a blockchain.

17. One or more non-transitory computer readable storage media encoded with instructions that, when executed by a processor of a network entity, cause the processor to:
  obtain a network packet including data;
  perform a first deterministic mathematical computation on the data to produce a first string of characters derived from the data;
  insert an indication of the first string of characters into the network packet;
  provide the indication of the first string of characters to a distributed ledger based on a secret unique identifier of the network entity, wherein the distributed ledger stores the indication of the first string of characters and records an indication of a time at which the indication of the first string of characters was stored in the distributed ledger;
  obtain, from the distributed ledger, the indication of the time;
  insert the indication of the time into the network packet; and
  provide the network packet towards a destination of the network packet configured to obtain the network packet, extract the indication of the time from the network packet, perform a second deterministic mathematical computation on the data to produce a second string of characters derived from the data, obtain the indication of the first string of characters from the distributed ledger, and determine whether the data is authentic by comparing the second string of characters with the first string of characters.

18. The one or more non-transitory computer readable storage media of claim 17, wherein the instructions further cause the processor to:
  establish a connection to the distributed ledger using the secret unique identifier; and
  provide the first string of characters to the distributed ledger, wherein the distributed ledger stores an identification of the network entity as having provided the first string of characters to the distributed ledger based on the secret unique identifier.

19. The one or more non-transitory computer readable storage media of claim 17, wherein the instructions further cause the processor to:
  encrypt the first string of characters using the secret unique identifier to produce an encrypted string of characters; and
  provide the encrypted string of characters to the distributed ledger.

20. The one or more non-transitory computer readable storage media of claim 17, wherein the instructions further cause the processor to provide the network packet to a second network entity, and wherein the second network entity is configured to:
  obtain the network packet;
  modify the data;
  after modifying the data, perform a third deterministic mathematical computation on the data to produce a third string of characters derived from the data;
  insert an indication of the third string of characters into the network packet;
  provide the indication of the third string of characters to the distributed ledger based on a secret unique identifier of the second network entity, wherein the distributed ledger records an indication of a second time at which the third string of characters was stored in the distributed ledger;
  obtain, from the distributed ledger, the indication of the second time;
  insert the indication of the second time into the network packet; and
  provide the network packet towards the destination.

* * * * *